Nov. 22, 1949 R. L. JAESCHKE ET AL 2,489,184
ELECTRONIC GOVERNING APPARATUS
FOR ELECTRIC MACHINERY
Filed May 10, 1948 2 Sheets-Sheet 2
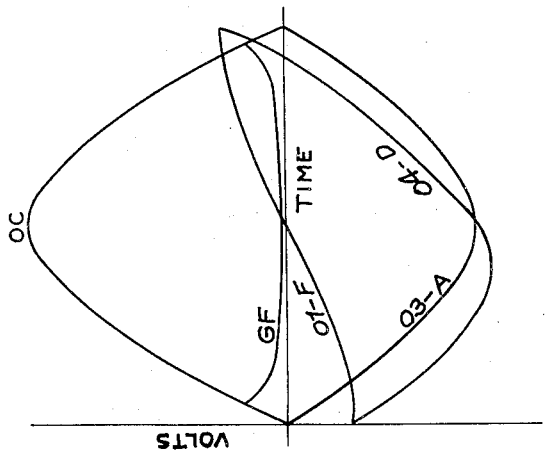
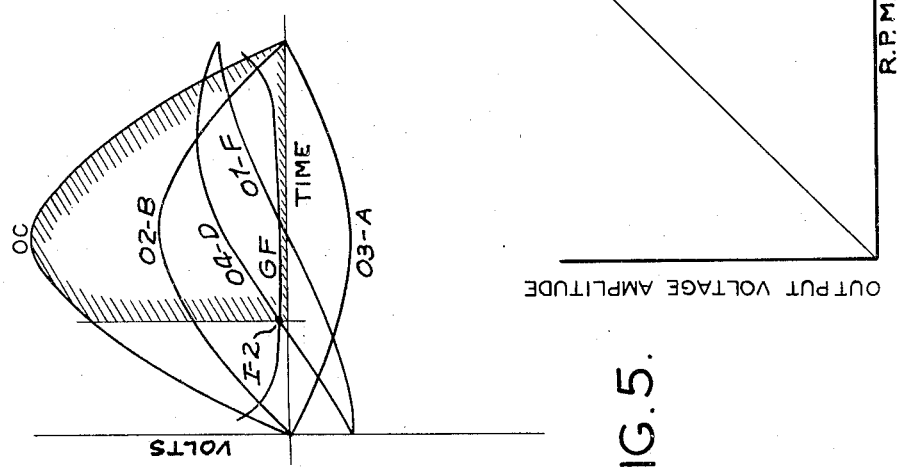
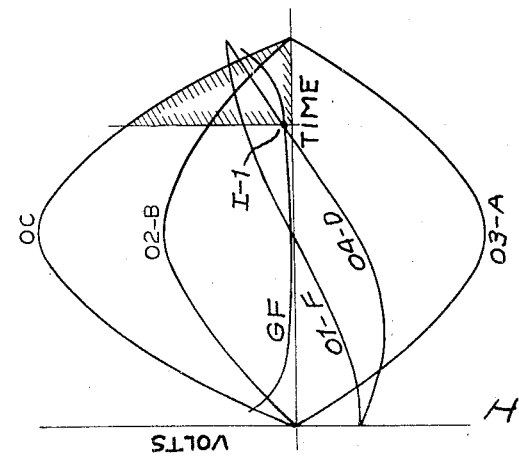
Ralph L. Jaeschke,
Donald V. Edwards,
Inventors.
Haynes and Toering,
Attorneys.

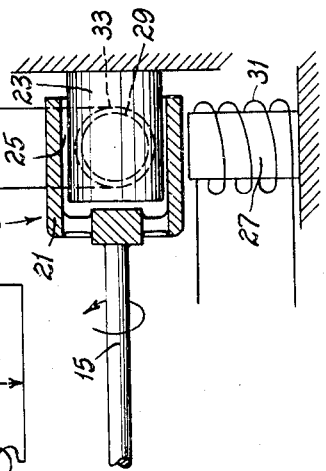

Patented Nov. 22, 1949

2,489,184

UNITED STATES PATENT OFFICE 2,489,184

ELECTRONIC GOVERNING APPARATUS FOR ELECTRIC MACHINERY

Ralph L. Jaeschke, Kenosha, Wis., and Donald V. Edwards, Montclair, N. J.; said Jaeschke assignor to Dynamatic Corporation, Kenosha, Wis., a corporation of Delaware; said Edwards assignor to Electrons, Inc., Newark, N. J., a corporation of Delaware Application May 10, 1948, Serial No. 26,224

15 Claims. (Cl. 172—284)

This invention relates to electronic governing apparatus for electric machinery, and with regard to certain more specific features, to speed-control apparatus of this type for electric slip couplings including eddy-current clutches.

Among the several objects of the invention may be noted the provision of an improvement upon electronic governing control apparatus of the general class shown in U. S. Patents 2,277,284, 2,353,107 and 2,411,122; the provision of apparatus of this class employing no critical elements such as electron tubes for amplification or for controlling grid voltages, thereby reducing the number of tubes necessary and also improving steadiness of operation; the provision of apparatus of this class which accurately governs independently of line voltage changes, no voltage corrective elements being required in any grid circuits; and the provision of apparatus of this class which can be more reliably made at a substantial reduction in cost. Other objects will be in part apparent and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which one of various possible embodiments of the invention is illustrated, Fig. 1 is an electromechanical diagram illustrating the invention;

Fig. 2 is an illustrative wave diagram showing relationships demanding deceleration;

Fig. 3 is a wave diagram similar to Fig. 2 showing relationships demanding acceleration;

Fig. 4 is a wave diagram similar to Figs. 2 and 3 showing relationships occurring under cut-off conditions;

Fig. 5 is a chart illustrating the voltage speed characteristics of a slip-phase generator; and, Fig. 6 is a diagrammatic cross section illustrating the mechanical form of said slip-phase generator.

Similar reference characters indicate corresponding parts throughout the several views of the drawings.

Various means have been proposed for regulating the speeds of output shafts of electrical slip couplings (eddy-current slip couplings and the like) by means of electronic circuits feeding the D. C. field coils of such couplings. A typical scheme was to connect the output shaft of the slip coupling (the speed of which was to be regulated) to an ordinary A. C. generator. The output voltage of the A. C. generator was rectified, offset against a reference voltage and then employed, often with amplification, to control the grid or grids of main power rectifier tubes feeding the field coil of the slip coupling. While such systems are satisfactory advances over their predecessors employing rheostats and the like, their cost relative to the present system is higher because of the number of coordinated electronic elements required therein for the grid-controlling portions of the circuits and for the circuits necessary (when used) for correcting the effects of variations in the line voltage supplying the system. The reason for this state of affairs is that in the case of an ordinary A. C. generator feeding an electronic circuit both amplitude and frequency of the generator output change with speed and must be dealt with in the electronic circuit. The present invention eliminates the ordinary A. C. generator formerly used and employs a slip-phase type of generator in such a manner that steadier control can be obtained, despite line voltage variations. This is accomplished with fewer costly electrical parts and with greater simplification in design and operation. As will be shown, a slip-phase generator has amplitude of voltage only as a function of speed, speed and frequency being independent variables.

Referring now more particularly to the drawings, there is shown at numeral 1 an ordinary A. C. motor which operates at a substantially constant speed. The output quill or shaft 3 of this motor is connected to a magnetic rotor element 5 of an eddy-current slip coupling, the latter being designated generally by numeral 7. Thus the shaft 3 constitutes the drive shaft of the coupling 7. The member 5 in this case is the magnetic inductor of the eddy-current coupling 7. The magnetic polar field member of the coupling is shown at numeral 9, the field winding of which is indicated at 11. The poles in the form of teeth are indicated at 13. The field member is connected to the driven shaft 15, the speed of which is to be regulated. Numerals 17 indicate slip rings through which current is supplied to the field coil 11. Shaft 3 is supported by and rotates on bearings 2 carried on shaft 15, which in turn is supported by and rotates in bearings 4 of a stationary case 6. Apparatus of this general class is already known and requires no further description (see, for example, Patent 2,286,778). As is also known, the field 11 and poles 9 may be driven by the driving shaft 3 and the inductor member 5 may be carried on the driven shaft 15, comprising a mere inversion.

According to the present invention, the driven shaft 15 drives a slip-phase generator, one form of which is indicated generally at 19. Slip-phase generators are sometimes known as drag-cup generators. For example, such a generator comprises (Fig. 6) a non-magnetic, conductive (for example, copper) inductor drum, cup or sleeve 21, inside of which is a stationary magnetic (iron, for example) circular armature 23. The gap 25 between the inductor 21 and armature 23 is as small as is mechanically feasible for the type of bearing support employed for the shaft 15 which carries the inductor. Outside of the inductor 21, located at an interval of 90° or so of arc, are poles 27 and 29. The exact angle is a matter of design choice. These poles have windings 31 and 33, respectively, of which 31 is a primary A. C. exciting winding and 33 is an inductively activated secondary A. C. output winding. These poles 27 and 29 constitute an operative pair. Only one pair is shown, but additional pairs could be used to cover the 360° circle. Such additional pairs could be connected to increase the voltage output, but this is an optional matter. The description herein is posited upon one pair of windings as shown.

The principle of operation of the generator 19 is that the exciting A. C. winding 31 produces a reversing magnetic pole which induces A. C. eddy currents in the copper inductor sleeve 21. Due to inductive lag, these eddy currents continue their circulations long enough in the sleeve 21 so that they are carried bodily with the sleeve from a position adjacent pole 27 to a position adjacent pole 29. The distance that they are carried is a function of speed of the sleeve. At pole 29 the A. C. eddy currents induce A. C. currents in the secondary inductor winding 33. These induced A. C. currents have voltages which are practically in phase with those in the exciter winding 31. Any lag involved is inappreciable. As will appear, the variable voltages employed in the present example are A. C., but pulsating D. C. could also be used. In this type of generator the amplitude of the induced voltage in the winding 33 is substantially in a direct (straight-line) proportion to the speed of shaft 15, as illustrated by Fig. 5.

In the present example, A. C. excitation voltage for the winding 31 is produced in phase from a secondary component 35 of a transformer indicated generally at 37. The secondary 35 and the winding 31 are connected by leads 39. The primary of transformer 37 is shown at 41 and is connected across line wires 43 supplied with A. C. current (preferably, though not necessarily, of 60 cycles per sec. frequency). In the line 43 is a suitable line switch 45 and fuses 47.

Another secondary component 49 (of transformer 37) supplies an A. C. reference voltage through a circuit 57 across points O2 and B, as determined by the setting of a control potentiometer 55. Thus potentiometer 55 adjusts the amplitude of the potential of the A. C. wave in circuit 57. Unequal resistors 51 (2,000 ohms, for example) and 53 (100,000 ohms, for example) are connected across the circuit 57 with a wire 59 interconnecting at S, which provides for a biasing voltage division to be commented upon below.

The A. C. voltage induced in winding 33 is impressed across points O3 and A, the latter being connected in 180° voltage phase opposition with the voltage at the adjusting arm of the potentiometer 55 (see wire 63). The connection O3 leads to the adjusting arm of a potentiometer 65, which is in an A. C. phase-shift circuit 67, fed by another secondary 69 of said transformer 37. Circuit 67 includes a condenser 64 by means of which, in connection with winding 69, the A. C. voltage across points O1 and F is shifted in phase. A 90° phase shift is suitable and the value of the condenser 64 relative to 69 is calculated accordingly.

From the above it is clear that the output voltage from the winding 33 as it exists across points O3 and A is connected in voltage opposition to the voltage across points O2 and B. Since the output voltage of winding 33 has a straight-line functional relationship with the increase or decrease in speed of shaft 15, a variable A. C. voltage is obtained for opposing the adjustable A. C. reference voltage across said points O2 and B.

The voltage across points O1 and F is in series connection with the voltages across points O3 and A and also points O2 and B, and provides a 90° phase displacement for application through a grid-blocking resistor 61 to the grid 75 of a gas-filled power rectifier tube 77. The cathode of the tube 77 is shown at 79, the same being energized from a secondary 81 of transformer 37. The anode or plate 83 of this tube is supplied with A. C. operating voltage by means of a secondary 85 of the transformer 37, the anode-cathode circuit being completed through the exciter coil 11 of the slip coupling 7 (note connections 87, 17, 89, 91 and 93). Connected across this circuit in parallel with the tube 77 is a back-rectifier tube 95, having a cathode 97 heated from said secondary 81 and an anode or plate 99 connected with the secondary 85. The function of this tube 95 relative to tube 77 is to cooperate with the tube 77 to produce a unidirectional current in the coil 11. Either tube 77 or 95 is a halfwave rectifier. With both tubes, unidirectional current is obtained according to the principles described in said U. S. Patent 2,411,122. Briefly, as indicated the tube 95 herein is not grid-controlled, and is substantially of the same current capacity as tube 77. Tube 77 becomes a half-wave rectifier and the current flowing through it occurs only in that period of the A. C. cycle when the grid-controlled anode 83 thereof is relatively positive. Since the exciting coil 11 has relatively high inductance and since it is in a D. C. unit, energy is stored in it during the period in the cycle of current increase. When the rectified current ceases to flow from the tube 77, this stored energy in the coil 11 and the voltage, caused by the collapse of the flux surrounding the coil 11, has a tendency to prolong the current in the same direction in which it was flowing through tube 77. However, since the tube 77 is non-conducting when its anode 83 becomes negative, this follower current from the coil 11 by-passes tube 77 and takes a path through tube 95, which by this time has become positive at its anode 99. It may be noted that anode 99 is negative when the tube 77 is positive. In other words, tube 95 is inactive during the time that tube 77 is active, because the anode 99 of tube 95 is connected to the opposite terminal of the secondary 85. Thus under the tendency of the coil 11 to discharge, tube 95 prolongs the current through the coil. The result is that pulsating D. C. current in coil 11 may be maintained without complete interruption, even though the tube 77 is a half-wave rectifier. The passage of current through the tube 95 is substantially determined by the value of current established by the tube 77. The average value of this continuous current is its effective value for clutch operation. It will be understood that, if desired, all the elements of both tubes 77 and 95 may be incorporated in a single gas-confining envelope. Thus the maximum number of essential electron tubes is two, which may be reduced to one by integrating said envelopes.

In respect to the number of tubes used, it is to be observed, however, that if it is more desirable to obtain a given amount of power output with several groups of tubes such as 77 and 95, instead of with one or a pair as above stated, this is admissible. The stated advantages of the invention in regard to reduction in number of tubes is directed to the eliminated tubes, which are usually used for grid-control purposes. Tubes 77 and 95 are not such but are the basic power tubes of the apparatus and of course power may be increased either by increasing the size of such a tube or multiplying the number used. The former is, however, preferable within limits.

Figs. 2, 3 and 4 illustrate certain operating conditions of the apparatus. The index characters used on the wave forms correspond to index characters used in Fig. 1, so as to indicate A. C. voltages across the appropriate points in the circuit to which said characters have been applied. 0—C is the voltage wave applied to the anodes of the tubes 77 and 95 for operating these tubes. 02—B is the A. C. reference voltage appearing across the potentiometer 55. This is constant for each adjustment (compare Figs. 2 and 3). 03—A is the A. C. potential appearing across the output winding 33 of the slip-phase generator 19 which, it will be recalled, varies only in amplitude in a direct proportion with the speed of the generator. Frequency is constant, as determined by the frequency of line 47. When the voltages across 03—A and 02—B are equal (and they are always in opposition) there will result from the use of the resistors 51 and 53 a small grid bias potential across points 01 and F in the circuit. This is, for example, of the order of three to ten volts or so (not shown in Figs. 2-4). It will be noted that the opposition voltages across 03—A and 02—B will not be the same under accelerating or decelerating governing conditions of the generator 19. Under ideal steady-state operation of the generator 19, they would be equal.

Curve 01—F represents the phase-shifting voltage component supplied by the phase-shifting circuit 67. The shift is shown as 90° in Figs. 2-4.

The composite result of potentials 02—B and 03—A, as modified by the phase-shifting functions 01—F of the circuit 67, are applied to the grid 75 of tube 77 from point 01 through the phase-shifting potentiometer 65 and grid-blocking resistor 61. The grid-firing curve for tube 77 is indicated at GF.

When the grid 75 is sufficiently positive (as determined by the composite of the voltages on the grid), the tube 77 will fire, depending upon the exact form of its grid-firing curve GF. The composite sum curve of the voltage waves 02—B, 03—A and 01—F is shown by the curve 04—D. Firing is determined by the intersection of the curves 04—D and GF. This intersection is I—1 in Fig. 2 and I—2 in Fig. 3.

Fig. 2 in an exaggerated manner represents transitory conditions in which the shaft 15 is incipiently tending to overspeed and requires deceleration, which is to be managed by reducing excitation in coil 11, which loosens the drive coupling. The immediate result of overspeeding is to increase the amplitude of the negative A. C. potential wave 03—A emanating from winding 33, the amplitude increase being proportional to the increase in speed of the generator. It is independent of generator frequency, since the frequency depends upon the frequency of the A. C. supply line 47. Hence the amplitude of curve 03—A increases, whereas that of curve 02—B remains unchanged in the positive direction. At the same time, the component represented by curve 01—F is unchanged as long as the potentiometer 65 is unchanged in position. As stated, the result of the three component curves 02—B, 03—A and 01—F is the curve 04—D in Fig. 2, which under the stated conditions cuts the grid-firing curve GF at I—1. The firing release condition is indicated by the hatching under curve 0—C. It should be understood that the gas-filled tubes used are of the type which, when once fired, will continue conductive until the anode voltage wave 0—C in question reaches zero potential. Thus the average current flow through the exciter coil 11 depends upon the shaded areas of successive cycles. This in Fig. 2 is relatively small, resulting in relatively small current through exciter coil 11 tending to loosen the coupling and causing corrective reduction in speed of shaft 15.

Fig. 3 represents transitory conditions in which the shaft 15 is tending to underspeed and requires acceleration, which is to be managed by increasing excitation in coil 11, which tightens the drive coupling. The immediate result of underspeeding is to reduce the amplitude of the A. C. potential wave 03—A emanating from winding 33, the amplitude decrease being proportional to the decrease in speed of the generator. This means that the amplitude of the curve 03—A decreases, whereas that of the curve 02—B still remains unchanged in the opposite phase. At the same time, the component represented by curve 01—F is unchanged. The result of the three component curves 02—B, 03—A and 01—F is the changed curve 04—D in Fig. 3, which under the stated conditions, cuts the grid-firing curve GF at I—2. The new firing release condition is indicated by the hatching under curve 0—C. In Fig. 3, the hatched area is relatively larger than in Fig. 2, indicating that the average output from tubes 77 and 95 has increased through coil 11, thus tightening the coupling in the slip coupling 7 correctively to increase speed of the shaft 15.

Conditions oscillate rapidly between those exaggeratedly shown in Figs. 2 and 3 to maintain a very close average value of speed of the shaft 15 without appreciable hunting or drift.

In the above descriptions of the conditions in Fig. 2 and 3, it was assumed that the potentiometers 55 and 65 had been untouched after adjustment. The adjustment of 55 is made for the predetermined speed desired, and the adjustment of potentiometer 65 is made for the desired sensitivity, as will be explained.

As the potentiometer 55 is moved counterclockwise, the amplitude of curve 02—B in Figs. 2 and 3 is reduced, which means that voltage balance across points 03 and 02 in Fig. 1 will occur at another predetermined speed of the shaft 15.

In Fig. 4 is illustrated the result of moving the arm of the potentiometer 55 completely anticlockwise to zero voltage position (i. e., the curve 02—B disappears) representing substantially zero speed setting for shaft 15. This leaves curves 03—A (voltage from winding 33) and and curve 01—F (phase-shifting voltage from circuit 67) as the controlling factors for determining the curve 04—D. The result is that curve 04—D is greatly depressed, so that it does not cut the grid-firing curve GF anywhere within the range of the grid-firing curve GF. Thus, the tubes 77 and 95 deliver no current to the coil 11 and the clutch is completely released. The shaft 15 will then coast toward a stop as the amplitude of the voltage 03—A decreases. While negative voltage is still being delivered across point 03—A and the voltage across point 01—F is still operative, nevertheless the bias at 75 is arranged to be less negative than that at 02. Therefore, complete shut-off can be provided by adjusting potentiometer 55. Bias is determined at S by resistances 51 and 53.

If the voltage of line 43 rises or falls, the voltage amplitude waves 02—B and 03—A vary equally in their respective positive and negative amplitudes without shifting phase, that is, in step. This means that their difference remains constant, and since it is this difference that is algebraically added to the voltage amplitude 01—F, the sum curve 04—D is unaffected. Therefore the point of intersection of the curve 04—D with the grid-firing curve GF is not affected by voltage fluctuations in line 43. Hence, no undesirable effects requiring correction occur due to line-voltage variations.

The governing effect of voltage wave 04—D (the algebraic sum of 02—B; 03—A; and 01—F) is extremely rapid and, being independent of fluctuations in the voltage of line 43 (because of the symmetrical effect of the latter on all waves), results in extremely close regulation or freedom from speed drift.

Sensitivity can be increased or decreased by varying the amplitude of the A. C. output of the potentiometer 65. By increasing the voltage out of potentiometer 65 (turning clockwise, the out-of-phase wave 01—F will have a steeper side, resulting in a steeper side in wave 04—D, thus causing a change in sensitivity of regulation. The steeper wave 04—D is, the less the sensitivity, and vice versa. This ability to adjust sensitivity of regulation is advantageous from an operating viewpoint.

It should be observed in connection with Figs. 2, 3 and 4 that they are of an ideal nature and no attempt has been made to indicate the result of negative grid bias, but its value is set so that when voltage 03—A of Fig. 4 dies out, the reference axis for the only remaining controlling voltage 01—F is such that the curve 01—F is relatively depressed so that it will not cross the grid-firing line GF and complete stoppage can be effected. Also, true sine waves are illustrated, whereas in practice there is some deviation from this form. Furthermore, amplitude variations have been exaggerated for clarity and actually the variations under governing conditions are much smaller. Thus the drift and hunting characteristics of the apparatus as it has been built are quite small and less than might be inferred from the illustrative emphases employed in Figs. 2–4. It is also to be understood that Figs. 2-4 show a positive half-wave period (relative to 0—C) for tube 77, the remaining negative half wave being unimportant, inasmuch as the tube 77 does not conduct under negative plate voltages.

It is during this period that the back-rectifier tube 95 operates to maintain conduction.

Advantages of the invention are that A. C. frequency and voltage variations in the line 43 are substantially eliminated or at least minimized as a factor controlling the position of the point of intersection between curve 04—D and the grid-firing curve GF. This is because voltage frequency does not depend upon the speed of generator 19 but is fixed by the frequency of line 47. Changes in A. C. voltage amplitude are to a large extent self-corrective in the voltage opposition parts of the circuit, as all these parts are fed from the same supply line. No voltage regulator tubes are required such as are needed where control is effected by applying rectified current to tube grids. The consistency of operation is better than in circuits wherein voltage regulator tubes are used. Furthermore, the cost of the circuit is considerably reduced by eliminating voltage regulator tubes and all rectifier tubes that would otherwise be needed to apply D. C. to the grid 75.

The system is also quite flexible from the design viewpoint. Heavier currents may be accommodated, so that rheostats with heavier windings can be used for the potentiometers 55 and 65. In fact, the cost of a circuit of this type is one-third or more less than the circuits upon which it is an improvement.

Although the circuits 57 and 67 etc. have been referred to as circuits per se, it will be understood that they may be considered to be sections of the network in which they are located.

It is to be understood that the circuit described herein may be used for supplying D. C. to any D. C. machine such as D. C. motors, dynamometers and the like. In such cases the desired D. C. unit would take the place of the apparatus in the casing 6. The field winding of the machine in question would be substituted for the field winding 11 in the leads 87, 89. The generator 19 would be driven by the shaft. If the alternatively suggested machine were a dynamometer, it would be desired to have the field strengthened upon increase in rotational speed and weakened upon decrease in rotational speed. This would only require the transposition of the connections to the terminal points F and S.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

We claim:

1. Governing apparatus for D. C.-excited machinery having an exciter coil and a driven shaft; comprising an A. C. generator operated by the driven shaft, said generator having an A. C. output winding of voltage substantially proportional to speed, an A. C. supply circuit, an A. C. input winding for said generator supplied from said A. C. supply circuit, a rectifier tube and circuit supplying D. C. to said exciter coil and energized from said supply circuit, said tube including a cathode, an A. C. grid and an anode, an A. C. reference voltage circuit supplied from said supply circuit and connected in phase opposition with said generator output winding, circuit connections from said opposed reference voltage circuit and output winding to the grid, and an A. C.

phase-shifting circuit supplied from said supply circuit and including a part in one of said connections.

2. Governing apparatus for D. C.-excited machinery having an exciter coil and a driven shaft; comprising an A. C. slip-phase generator operated by the driven shaft, an A. C. supply circuit having a predetermined frequency, said generator having an A. C. input exciter winding supplied at said frequency from said A. C. supply circuit, an A. C. output winding of said generator operating at said frequency and having a voltage substantially proportional to generator speed, a rectifier tube and circuit supplying D. C. to said exciter coil and energized by an A. C. voltage from said supply circuit at said frequency, said tube including in its circuit an A. C. control grid, an A. C. reference voltage circuit supplied at said frequency from said supply circuit and connected in phase opposition with said generator output winding, circuit connections from said opposed reference voltage circuit and output winding to the grid for compositely controlling the same, and an A. C. phase-shifting circuit supplied from said supply circuit at said frequency and including a part in said connections adapted to shift the phase of the composite controlling effect of the reference voltage circuit and output winding upon said grid.

3. Governing apparatus for D. C.-excited machinery having an exciter coil and a driven shaft; comprising an A. C. slip-phase generator operated by the driven shaft, an A. C. supply circuit having a predetermined frequency, said generator having an A. C. input exciter winding supplied at said frequency from said A. C. supply circuit, an A. C. output winding of said generator operating at said frequency and having a voltage substantially proportional to generator speed, a rectifier tube and circuit supplying D. C. to said exciter coil and energized by an A. C. voltage from said supply circuit at said frequency, said tube including in its circuit an A. C. control grid, an A. C. reference voltage circuit supplied at said frequency from said supply circuit and connected in phase opposition with said generator output winding, circuit connections from said opposed reference voltage circuit and output winding to the grid for compositely controlling the same, an A. C. phase-shifting circuit supplied from said supply circuit at said frequency and including a part in said connections adapted to shift the phase of the composite effect of the reference voltage circuit and output winding upon said grid, and an adjustable potentiometer in the reference voltage circuit for adjusting the governed speed of said driven shaft.

4. Governing apparatus for D. C.-excited machinery having an exciter coil and a driven shaft; comprising an A. C. slip-phase generator operated by the driven shaft, an A. C. supply circuit having a predetermined frequency, said generator having an A. C. input exciter winding supplied at said frequency from said A. C. supply circuit, an A. C. output winding of said generator operating at said frequency and having a voltage substantially proportional to generator speed, a rectifier tube and circuit supplying D. C. to said exciter coil and energized by an A. C. voltage from said supply circuit at said frequency, said tube including in its circuit a cathode, an A. C. control grid and an anode, an A. C. reference voltage circuit supplied at said frequency from said supply circuit and connected in phase opposition with said generator output winding, circuit connections from said opposed reference voltage circuit and output winding to the grid for compositely controlling the latter, an A. C. phase-shifting circuit supplied from said supply circuit at said frequency and including a part in said connections adapted to shift the phase of the composite effect of the reference voltage circuit and output winding upon said grid, an adjustable potentiometer in the reference voltage circuit for adjusting the governed speed of said driven shaft, and an adjustable potentiometer in said phase-shifting circuit for adjusting sensitivity of the apparatus.

5. Governing apparatus for D. C.-excited machinery having an exciter coil and a driven shaft; comprising an A. C. slip-phase generator operated by the driven shaft, an A. C. supply circuit having a predetermined frequency, said generator having an A. C. input exciter winding supplied at said frequency from said A. C. supply circuit, an A. C. output winding of said generator operating at said frequency and having a voltage substantially proportional to speed, a rectifier tube and circuit supplying D. C. to said exciter coil and energized by an A. C. voltage from said supply circuit at said frequency, said tube including in its circuit a cathode, an A. C. grid and an anode, an A. C. reference voltage circuit supplied at said frequency from said supply circuit and connected in phase opposition with said generator output winding, circuit connections from said opposed reference voltage circuit and output winding to the grid, an A. C. phase-shifting circuit supplied from said supply circuit at said frequency and including a part in said connections adapted to shift the phase of the composite effect of the reference voltage circuit and output winding upon said grid, an adjustable potentiometer in the reference voltage circuit for adjusting the predetermined speed of said driven shaft, and grid voltage biasing means in the reference voltage circuit.

6. Governing apparatus for D. C.-excited machinery having an exciter coil and a driven shaft; comprising an A. C. slip-phase generator operated by the driven shaft, an A. C. supply circuit having a predetermined frequency, said generator having an A. C. input exciter winding supplied at said frequency from said A. C. supply circuit, an A. C. output winding of said generator operating at said frequency and having a voltage substantially proportional to speed, a rectifier tube and circuit supplying D. C. to said exciter coil and energized by an A. C. voltage from said supply circuit at said frequency, said tube including in its circuit a cathode, an A. C. grid and an anode, an A. C. reference voltage circuit supplied at said frequency from said supply circuit and connected in phase opposition with said generator output winding, circuit connections from said opposed reference voltage circuit and output winding to the grid, an A. C. phase-shifting circuit supplied from said supply circuit at said frequency and including a part in said connections adapted to shift the phase of the composite effect of the reference voltage circuit and output winding upon said grid, an adjustable potentiometer in the reference voltage circuit for adjusting the predetermined speed of said driven shaft, grid voltage biasing means in the reference voltage circuit, and a potentiometer in said phase-shifting circuit for varying sensitivity.

7. Governing apparatus for D. C.-excited machinery having an exciter coil and a driven shaft;

comprising an A. C. slip-phase generator connected to the driven shaft and having an A. C. output winding of voltage substantially proportional to speed, an A. C. supply circuit of substantially constant frequency, an A. C. input winding for said generator supplied from said A. C. supply circuit at said frequency, a rectifier tube and circuit supplying D. C. to said exciter coil and energized by A. C. voltage from said supply circuit, said tube including a cathode, an A. C. grid and an anode, an A. C. reference voltage circuit supplied at said frequency from said supply circuit and connected in adjustable phase opposition with said generator output winding, circuit connections from said opposed reference voltage circuit and output winding respectively to the grid, and an adjustable A. C. phase-shifting circuit supplied at said frequency from said supply circuit and including a part in one of said connections for shifting the phase of the composite voltage effect of the reference voltage circuit and output winding upon said grid.

8. Governing apparatus for D. C.-excited machinery having an exciter coil and a driven shaft; comprising an A. C. slip-phase generator connected to the driven shaft and having an A. C. output winding of voltage substantially proportional to speed, an A. C. supply circuit, an A. C. input winding for said generator, a transformer having a primary in said supply circuit and a secondary feeding said input winding, a rectifier tube and circuit supplying D. C. to said exciter coil and energized from said supply circuit through a component of said transformer, said tube including in its circuit a cathode, an A. C. grid and an anode, a biased A. C. reference voltage circuit supplied from said supply circuit through and a second transformer component and connected in adjustable phase opposition with said output winding, circuit connections from said opposed reference voltage circuit and output winding respectively to the grid, and an adjustable A. C. phase-shifting circuit supplied from said supply circuit through another transformer component and located in one of said connections and forming a part of one of said connections adapted to shift the phase of the adjusted composite effect of the reference voltage circuit and output winding upon said grid and to adjust governing sensitivity.

9. Governing apparatus for D. C.-excited machinery having an exciter coil and a driven shaft; comprising an A. C. generator connected to the driven shaft, said generator having A. C. input and output windings and delivering A. C. from said output winding of voltage amplitude proportional to generator speed but of frequency proportional to frequency of the input winding; a rectifier tube having anode, cathode and grid elements; a network connecting said tube elements with said exciter coil and generator output winding, said network including a tube-fed D. C. circuit supplying said coil, a reference voltage section, a section connected from said generator output winding in phase opposition to said reference voltage section, and a phase-shifting section, all of said sections compositely feeding said grid; and apparatus for exciting said generator input winding and said network sections at a common frequency.

10. Governing apparatus for D. C.-excited machinery having an exciter coil and a driven shaft; comprising an A. C. slip-phase generator connected to the driven shaft, said generator having A. C. input and output windings; a rectifier tube having anode, cathode and grid elements; a network connecting said tube elements with said exciter coil and generator output winding, said network including a tube-fed D. C. circuit supplying said coil, an adjustable reference voltage section, a section connecting said generator output winding in phase opposition to said reference voltage section, and a phase-shifting section, all of said sections feeding said grid; and apparatus for exciting said generator input winding and said network sections at a common frequency.

11. Governing apparatus for D. C.-excited machinery having an exciter coil and a driven shaft; comprising an A. C. generator connected to the driven shaft, said generator having A. C. input and output windings and delivering A. C. from said output winding of voltage amplitude proportional to generator speed but of frequency proportional to the frequency of the input winding; a rectifier tube having anode, cathode and grid elements; a network connecting said tube elements with said exciter coil and generator output winding, said network including a tube-fed D. C. circuit supplying said coil, an adjustable reference voltage section, a section connected from said generator output winding in phase opposition to said reference voltage section, and an adjustable phase-shifting section, all of said sections being series-connected and compositely feeding said grid; apparatus for exciting said generator input winding and said network sections at a common frequency; adjustment of the reference voltage section affecting the grid to change the flow of current in said circuit supplying said coil for speed adjustment of said shaft, adjustment of said phase-shifting section controlling governing sensitivity.

12. Governing apparatus for D. C.-excited machinery having an exciter coil and a driven shaft; comprising an A. C. generator connected to the driven shaft, said generator having A. C. input and output windings and delivering A. C. from said output winding of voltage amplitude proportional to generator speed but of frequency proportional to the frequency of the input winding; a rectifier tube having anode, cathode and grid elements; a network connecting said tube elements with said exciter coil and generator output winding, said network including a tube-fed D. C. circuit supplying said coil, a reference voltage section, a section connected from said generator output winding in phase opposition to said reference voltage section, and a phase-shifting section, all of said sections compositely feeding said grid; apparatus for exciting said generator input winding and said network sections at a common frequency; an adjustable potentiometer in the reference voltage section affecting the grid to change the flow of current in said circuit supplying said coil for speed adjustment of said shaft, and an adjustable potentiometer in said phase-shifting section controlling governing sensitivity by affecting the steepness of the phase-shifted A. C. current wave.

13. Governing apparatus made according to claim 9, wherein said phase-shifting section includes an adjustable element adapted to vary steepness of the resulting frequency wave form applied to the grid.

14. Governing apparatus made according to claim 9, wherein said phase-shifting section includes an adjustable element adapted to vary steepness of the resulting frequency wave form applied to the grid, and wherein said reference voltage section includes an adjustable element adapted to vary the amplitude of the resulting frequency wave form applied to the grid.

15. Governing apparatus for machinery having an exciter coil and having a driven shaft, comprising an A. C. generator connected to the driven shaft, said generator having A. C. input and output windings and delivering A. C. from said output winding of voltage amplitude proportional to generator speed and of a frequency proportional to the frequency of the input winding, an electronic tube having anode, cathode, and grid elements; a network connecting said tube elements with said exciter coil and with the generator output winding, said network including a tube-fed circuit supplying said coil, a reference voltage section, a section connected with said generator output winding in phase opposition to said reference voltage section, and a phase-shifting section, all of said sections compositely feeding said grid; and apparatus for exciting said generator input winding and said network sections at a common frequency.

RALPH L. JAESCHKE.
DONALD V. EDWARDS.

REFERENCES CITED

The following references are of record in the file of this patent:

UNITED STATES PATENTS

| Number | Name | Date |
|---|---|---|
| 2,115,086 | Riggs | Apr. 26, 1938 |
| 2,353,107 | Winther | July 4, 1944 |

Certificate of Correction

Patent No. 2,489,184　　　　　　　　　　　　　　　　　　November 22, 1949

RALPH L. JAESCHKE ET AL.

It is hereby certified that error appears in the printed specification of the above numbered patent requiring correction as follows:

Column 11, line 38, after the word "through" strike out "and";

and that the said Letters Patent should be read with this correction therein that the same may conform to the record of the case in the Patent Office.

Signed and sealed this 21st day of March, A. D. 1950.

[SEAL]

THOMAS F. MURPHY,
*Assistant Commissioner of Patents.*